UNITED STATES PATENT OFFICE.

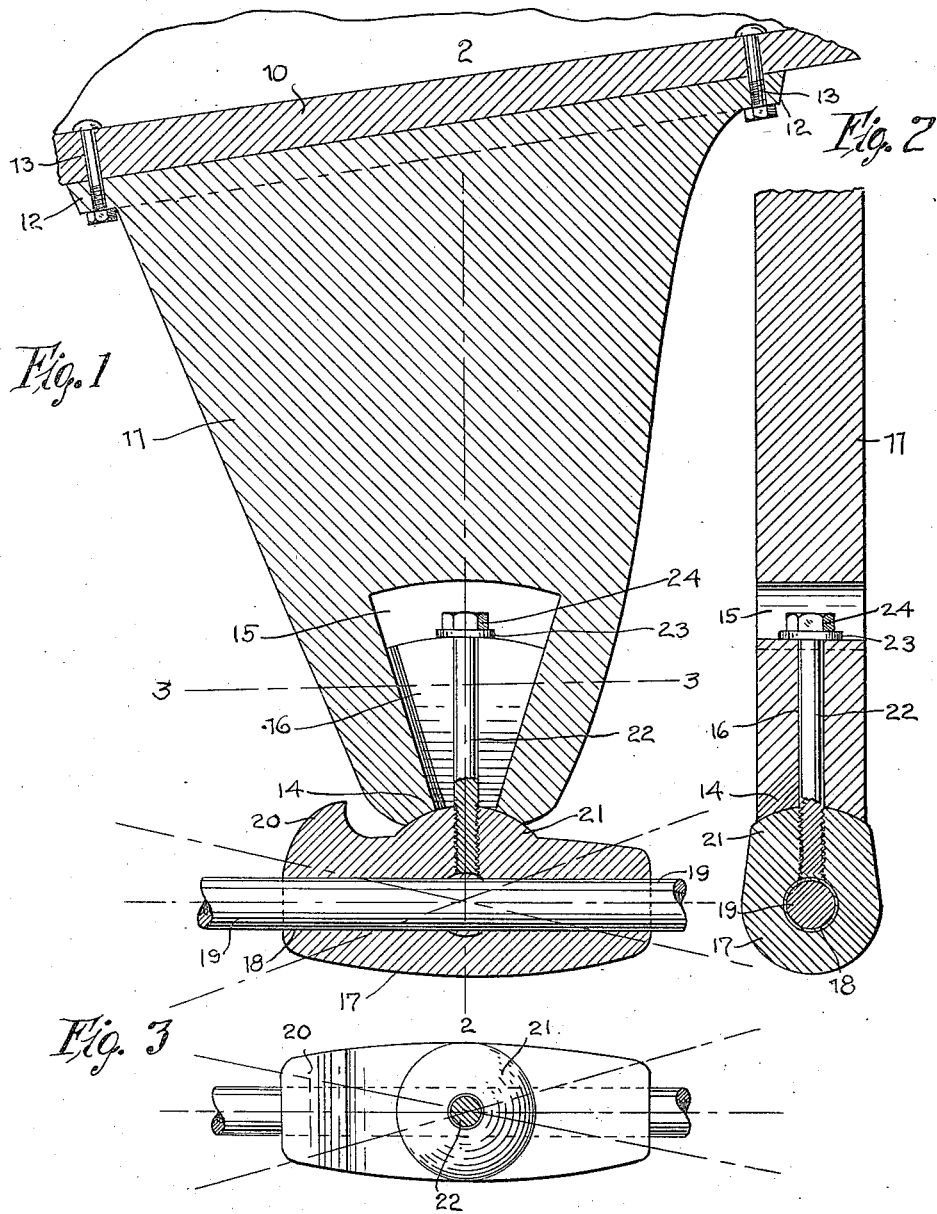

ALFONZO D. ROBBINS, OF FREEPORT, NEW YORK.

UNIVERSAL STRUT.

1,063,388.  Specification of Letters Patent.  Patented June 3, 1913.

Application filed June 6, 1912.  Serial No. 702,005.

*To all whom it may concern:*

Be it known that I, ALFONZO D. ROBBINS, a citizen of the United States, and resident of Freeport, in the county and State of New York, have invented certain new and useful Improvements in Universal Struts, of which the following is a specification.

This invention relates to bearings and has special reference to a stern bearing or outboard bearing for a boat.

More especially the invention relates to a bearing universally adjustable for supporting a propeller shaft.

The principal object of the invention is to improve and simplify the general construction of bearings of this character so that they may be positioned in such manner as to keep the propeller shaft in proper alinement.

With the above and other objects in view, this invention consists in general, as will be hereinafter apparent, of certain novel constructions, combinations and arrangements of parts, as will be hereinafter fully described, illustrated in the accompanying drawings, and specifically claimed.

In the accompanying drawings, like characters of reference indicate like parts in the several views, and Figure 1 is a vertical median section through a pedestal and bearing constructed in accordance with this invention. Fig. 2 is a section on the line 2—2, Fig. 1. Fig. 3 is a detail plan view of the bearing taken on the line 3—3, Fig. 1.

In the accompanying drawings there is illustrated at 10 the fashion plate of a boat to which is secured the pedestal which supports the bearing. This pedestal consists of a body portion 11 of substantially triangular form and this body portion is provided at its base with a flange 12 suitably bored for the reception of the bolts 13 which hold the pedestal to the fashion plate 10. The lower end of the pedestal 11 is somewhat truncated and is provided with a segmento-spherical socket 14. Extending through the body 11 is a transverse opening 15 which communicates with an opening 16 leading to the socket 14. The opening 15 is arcuate in form with the center of the arc co-incident with the center of the sphere of the socket and the sides of the opening 16 are in planes radial to said center.

The bearing itself comprises an elongated body 17 having a suitable opening 18 therethrough for the reception of the propeller shaft 19. At the forward end this bearing is provided with an upstanding shield 20 so that any obstacle striking this shield will not be wedged between the bearing and the pedestal but will be turned to one side or the other.

Upon the upper side of the bearing 17 is a segmento-spherical boss 21 which is of such radius as to fit the socket 14. Extending radially from this segmento-spherical boss is a bolt 22 which may be either screwed into the body 17, welded thereto, or formed integral therewith. The bolt 22 extends upward through the slot 17 which is of sufficient width to closely engage the bolt on the sides and on the upper end of the bolt there is provided a washer 23 and nut 24. The washer 23 extends over the slot so that by moving the upper end of the bolt along the opening 15 tilting in a fore and aft direction of the bearing 17 may be obtained, while by turning the bolt in the slot movement in athwartship direction may be obtained. By means of this the proper angle may be given the bearing to keep the outboard end of the shaft 19 in proper alinement with the inboard portion of the shaft.

In using the device the shaft may be put in position and the bearing and pedestal slipped thereon after which the pedestal may be slid up until it strikes the fashion plate, the bolt 22 being left loose to adjust itself to the proper angle of the shaft. The pedestal is then secured in position and the nut 24 tightened whereupon the bearing will be in proper position.

There has thus been provided a simple and efficient device of the kind described and for the purpose specified.

It is obvious that many minor changes may be made in the form and construction of this invention without departing from the material principles thereof, and it is therefore not wished to confine the invention to the exact form herein shown and described but it is wished to include all such as properly come within the scope claimed.

It is obvious that the pedestal may be made with two legs instead of the single body, the lower end remaining the same.

Throughout the foregoing description particular stress has been laid on the fact that this invention is of special utility in connection with propeller shafts, this for the reason that adjustable bearings are desirable in such use. However, it is to be understood that the invention is not limited to such use, for it will be clear that the same is capable of use in connection with shafts of all types wherein occasion might arise for adjusting the bearing for shafts. It will also be clear that while the bearing has been shown as a support for a continuous shaft, it can be readily used as a support for the ends of sectional or other types of shafts.

Having thus described the invention, what is claimed as new, is:—

1. In an outboard support for propeller shafts, a pedestal adapted to be secured to the fashion plate of a boat, a bearing at the lower end of said pedestal, a ball and socket formed on the bearing and pedestal, and a securing bolt arranged to hold said ball and socket in adjusted position.

2. In a device of the kind described, a pedestal comprising a body having a socket at its lower end, said pedestal furthermore having a transverse opening extending therethrough and a slot extending to the pedestal, said opening being arcuate in shape and the slot having diverging ends, a bearing comprising a body having an opening therethrough, and a segmento-spherical boss adapted to fit said socket, and a bolt secured to said bearing and passing through said slot into said opening, said bolt being provided at its upper end with a nut.

3. In a device of the kind described, a pedestal comprising a body having a socket at its lower end, said pedestal furthermore having a transverse opening extending therethrough and a slot extending to the pedestal, said opening being arcuate in shape and the slot having diverging ends, a bearing comprising a body having an opening therethrough, and a segmento-spherical boss adapted to fit said socket, a bolt secured to said bearing and passing through said slot into said opening, said bolt being provided at its upper end with a nut, and an upwardly extending shield on the front end of said bearing.

4. A universal support for shafts comprising a pedestal provided with a socket at one end, said pedestal having an arcuate transverse opening extending therethrough and a slot that connects the opening and socket, a bearing provided with a shaft opening and having a boss extending into the pedestal socket, a bolt carried by the bearing and extending through and movable vertically and transversely of the slot, and fastening means carried by the bolt and bearing on the base of the opening.

5. A universal support for shafts comprising a hanger, a shaft bearing, means for universally connecting the bearing to the hanger, and a shield carried by the bearing for guarding the connection between the hanger and the bearing.

6. A universal support for shafts comprising a pedestal and a bearing having respectively, a socket and a boss adapted for universal engagement, and means carried by the bearing and engaging the pedestal for fastening the bearing in adjusted position relatively to the pedestal.

Signed at city, county and State of New York, this 23d day of May A. D. 1912.

ALFONZO D. ROBBINS.

Witnesses:
CHAS. D. DURKEE,
E. B. DENNIS.

---

Copies of this patent may be obtained for five cents each, by addressing the "Commissioner of Patents, Washington, D. C."